J. G. McCORKLE.
CONTROLLING MEANS FOR THE VALVE OF A WATER SUPPLY PIPE.
APPLICATION FILED MAR. 10, 1914.
1,202,082. Patented Oct. 24, 1916.
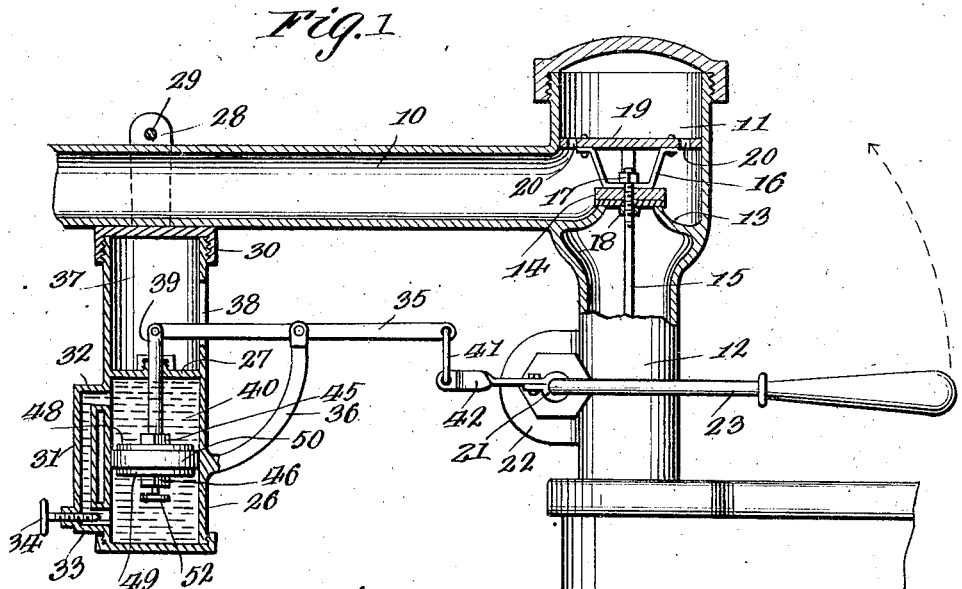
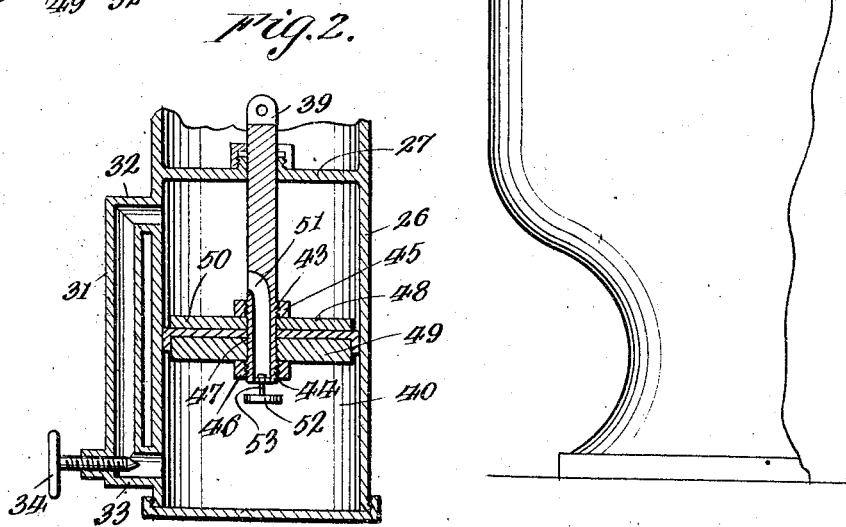
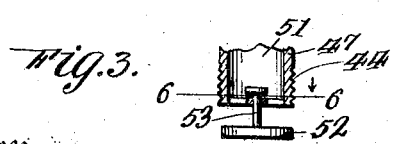
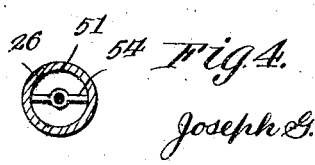
Witnesses
Guy K. Spring
Ross J. Woodward
Inventor
Joseph G. McCorkle
By Richard Bowen
his Attorney

UNITED STATES PATENT OFFICE.

JOSEPH GARFIELD McCORKLE, OF PITTSBURGH, PENNSYLVANIA.

CONTROLLING MEANS FOR THE VALVE OF A WATER-SUPPLY PIPE.

1,202,082.  Specification of Letters Patent.  Patented Oct. 24, 1916.

Application filed March 10, 1914. Serial No. 823,766.

*To all whom it may concern:*

Be it known that I, JOSEPH G. McCORKLE, a citizen of the United States, residing at Pittsburgh, in the county of Allegheny and State of Pennsylvania, have invented certain new and useful Improvements in Controlling Means for the Valve of a Water-Supply Pipe, of which the following is a specification.

This invention relates to a controlling means for the valve of a water supply pipe, and the principal object of the invention is to provide a device for controlling the closing of the valve, and thus preventing the valve from moving to a closed position too rapidly. In supply pipes of this character, it has been found that valves which are now in use will, after being used for a certain length of time, close too rapidly and shut off the flow of water through the discharge pipe before desired. This attachment will cause the valve to close slowly and thus prevent the valve from being closed until a sufficient amount of water has passed through the discharge pipe.

This invention is illustrated in the accompanying drawings wherein—

Figure 1 is a view showing the supply pipe and casing of the attachment in section, the movable elements of the attachment and the lower portion of the discharge pipe being shown in elevation; Fig. 2 is an enlarged sectional view of the lower portion of the casing which forms a part of this attachment; Fig. 3 is an enlarged sectional view of the lower end portion of the stem which forms part of this attachment; Fig. 4 is a sectional view taken along the line 6—6 of Fig. 3.

In the accompanying drawings the numeral 10 indicates the supply pipe which communicates with the valve housing 11 positioned above the discharge pipe 12 and divided from the discharge pipe by means of the perforated partition 13 which forms a valve seat. The valve 14 which is intended to rest upon the valve seat 13 is carried by the stem 15 which has its upper end threaded as shown in Fig. 1. This stem passes through the center of the supporting bracket 16 and carries a nut 17 which securely holds the bracket upon the stem. A clamping nut 18 is placed beneath the valve 14 so that the bracket 16 and valve 14 will be held rigidly upon the upper end portion of the stem 15. The diaphragm 19 which is carried by the bracket 16 is provided with openings 20 which permit water to pass through the diaphragm and thus permit the diaphragm to move easily in the valve housing 11.

A rocker shaft 21 is rotatably mounted in a shoulder or bearing 22 extending from the discharge pipe 12 and has its outer end portion bent to form a handle 23 by means of which the rocker shaft may be oscillated. This rocker shaft may be connected with the stem 15 in any suitable manner so that when the handle 23 is raised, the valve stem 15 will be moved upwardly to move the valve 14 off of the valve seat 13 and thus permit water to flow from the supply pipe 10 through the discharge pipe 12.

The attachment by means of which the closing of the above described valve is controlled will now be described. A casing 26 which is provided with a partition 27 is connected with the supply pipe 10 by means of the clamping arms 28 which inclose the supply pipe and are connected by a screw bolt 29. These clamping arms 28 are carried by the cap 30 of casing 26 and it will thus be seen that the casing will be suspended beneath the supply pipe. A small pipe 31 has its upper and lower necks 32 and 33 communicating with the casing 26 adjacent the bottom of the casing and adjacent the partition 27 so that the oil which is placed in the casing may pass from one end of the casing to the other. A needle valve 34 is provided so that the passage of the oil through the conduit or pipe 31 may be regulated.

A lever 35 is pivotally connected with the supporting arm 36 and extends into the upper chamber 37 of the casing 26 through the slot 38. The inner end of the lever 35 is pivotally connected with the upper end of the piston 39 so that by moving the outer end of the lever downwardly, the piston may be drawn toward the top of the chamber 40 in which the oil is placed. A link 41 connects the lever 35 with arm 42 which arm is secured to the rocker shaft 21. It will thus be seen that when the handle 23 is raised to oscillate the rocker shaft, the lever 35 will be moved to draw the piston 39 upwardly.

The lower end of piston 39 is provided with threaded sections 43 and 44 so that clamping nuts 45 and 46 may be placed upon the piston 39. Upon the unthreaded section 47 of the piston between the threaded sections 43 and 44 there are placed the washers 48 and 49 between which is placed the cup 50 formed of rubber, leather, or any other suitable material. A passage way 51 is formed in the lower end portion of the piston and extends from the lower end to a point above the nut 45. The valve 52 which comprises the passage of oil through this passage 51 has its supporting stem 53 slidably mounted in an opening formed in the yoke 54 extending transversely across the passage 51. It will thus be seen that as the piston moves upwardly, the oil may pass through the passage 51 as well as being forced through the pipe 31, whereas when the piston is moving downwardly, the pressure of the oil will force the valve 52 against the lower end of the piston thus closing the passage 51 and causing the oil to be forced slowly through the conduit 31. Therefore the piston 39 can be quickly raised but will be retarded in its downward movement thus preventing the valve 14 from seating upon the valve seat 13 before desired.

The operation of this device is as follows: When the handle 23 is raised, the rocker shaft 21 is rocked to raise the valve stem 15 and move the valve 14 off of the valve seat 13. At the same time the lever 35 is moved to raise the piston 39 to the upper end of the chamber 40 in which the oil is placed. The weight of diaphragm, together with the suction caused by water passing from the supply pipe 10 through pipe 12 will cause the valve 14 to return to the valve seat 13. The rapid closure of this valve 14 will, however, be prevented since when the valve 14 is closing, the lever may move and this movement is retarded by the fact that the piston head can only move slowly in the chamber 40. It will thus be seen that a chamber has been provided which will regulate the closing of valve 14 and prevent the valve from closing too rapidly. It will also be noted that by means of the needle valve 34, the passage of the oil through the conduit 31 is regulated and therefore by adjusting this needle valve, the speed with which the oil passes through the conduit pipe 31 may be regulated and thus the speed of the downward movement of the piston head controlled. It will therefore be seen that when this attachment is first installed, the needle valve can be left wide open or partially closed and that after the attachment has been installed for some time so that the valve 14 seats more rapidly than desired, the needle valve can be moved to more completely close the neck 33 and thus cause the oil to pass more slowly through the conduit 31.

What is claimed is:

An attachment of the character described comprising a casing provided with a passageway leading from one end of the casing to the other end thereof, a piston head slidably mounted in said casing between the terminals of said passageway, a piston rod extending into said casing and carrying said piston head and having its inner end portion provided with a passageway leading from the lower end of the piston rod and terminating above the piston head in a side opening, a bridge extending across the inner end of the passageway in said piston rod and provided with an opening, a valve positioned beneath said piston rod, and a stem extending from said valve through the opening of said bridge, to slidably suspend the valve beneath the piston rod.

In testimony whereof I affix my signature in presence of two witnesses.

JOSEPH GARFIELD McCORKLE.

Witnesses:
GEORGE HENRY SPEER,
LEWIS G. ULMER.